United States Patent
Brockway et al.

(10) Patent No.: US 6,842,766 B2
(45) Date of Patent: *Jan. 11, 2005

(54) CLIENT SIDE CACHING OF PRINTER CONFIGURATION

(75) Inventors: Tad Dennis Brockway, Redmond, WA (US); Madan Mohan R. Appiah, Redmond, WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/458,369

(22) Filed: Dec. 9, 1999

(65) Prior Publication Data
US 2003/0115256 A1 Jun. 19, 2003

(51) Int. Cl.[7] .............................................. G06F 15/16
(52) U.S. Cl. ....................... 709/203; 709/220; 709/221
(58) Field of Search ................................ 709/203, 200, 709/220–223; 710/18, 15, 20, 21, 104, 8, 10; 713/1, 2, 100; 358/1.15

(56) References Cited

U.S. PATENT DOCUMENTS

| | | | | |
|---|---|---|---|---|
| 5,580,177 A | * | 12/1996 | Gase et al. | 358/1.15 |
| 5,692,111 A | * | 11/1997 | Marbry et al. | 358/1.15 |
| 5,761,505 A | * | 6/1998 | Golson et al. | 709/225 |
| 5,809,287 A | * | 9/1998 | Stupek et al. | 703/22 |
| 6,018,769 A | * | 1/2000 | Tezuka et al. | 709/220 |
| 6,131,134 A | * | 10/2000 | Huang et al. | 710/302 |
| 6,154,787 A | * | 11/2000 | Urevig et al. | 710/8 |
| 6,201,611 B1 | * | 3/2001 | Carter et al. | 358/1.13 |
| 6,288,790 B1 | * | 9/2001 | Yellepeddy et al. | 358/1.13 |
| 6,301,012 B1 | * | 10/2001 | White et al. | 292/148 |
| 6,345,319 B2 | * | 2/2002 | Lin et al. | 707/100 |
| 6,424,424 B1 | * | 7/2002 | Lomas et al. | 358/1.14 |

* cited by examiner

Primary Examiner—Marc D. Thompson
(74) Attorney, Agent, or Firm—Amin & Turocy, LLP (57) ABSTRACT

A server-client system is configured to store, on a client, server configuration information relating to a peripheral device connected at the client and parameter settings for the peripheral device. The information is updated as changes occur. After the client has been disconnected from the system and the peripheral device uninstalled, the peripheral device is automatically installed and the parameter settings restored without requiring significant user interaction when the client reconnects. The automatic installation and restoring is performed even if the client is connected to a different server than it was originally.

40 Claims, 4 Drawing Sheets

CLIENT SIDE CACHING OF PRINTER CONFIGURATION

TECHNICAL FIELD

This invention relates to server-client systems and, in particular, to a server-client system in which system configuration information for a server is stored on a client.

BACKGROUND

In a typical server-client system, a server computer is connected to several client computers or terminals via a network. In such server-client systems, applications are executed at the server rather than at the client. The server transmits display information to the client for display at the client, and user inputs (e.g., via keyboard or mouse) at the client are transmitted to the server for processing by an application(s) executing at the server. The "client" may be an entire client computer, or alternatively an application executing at the client computer.

A server in such a system typically has an operating system that can run several client sessions concurrently. Each client user has access to various resources of the server, including the processor, data storage, application programs, etc. Software applications that are resident on the server are available to each client for independent execution by the client. Each session is independent from the other sessions and, therefore, one client cannot access information relating to another client. In this manner, the server provides a logically independent machine for each client connected to the server.

Client users frequently use peripheral devices at the client machines. For example, a user may wish to attach a printer to the user's client computer (a "local" printer) in order to print data generated by an application that is running on the server computer. To do this, the user must manually install the local printer and redirect the printer queue created by the server to the I/O port of the client computer to which the printer is connected. Such manual installation of peripheral devices is undesirable because it requires significant time and effort on the part of the user.

A co-pending application U.S. patent application Ser. No. 09/458,365, filed Dec. 9, 1999, now U.S. Pat. No. 6,789,111 entitled "Automatic Detection And Installation Of Client Peripheral Devices By A Server", to Tad Brockway, Madan Appiah, Adam Overton, and Ritu Bahl, filed concurrently herewith, describes a system in which peripheral devices attached to the client are automatically detected and corresponding device drivers installed at the server.

However, not all client peripheral devices can be automatically detected and installed. For example, if a printer is an older model that was manufactured before automatic detection technology was developed, it will not generate an identifier signal that is recognizable by the client or the server. Or, if the attached printer is a newer model but the client runs an older operating system that does not recognize the newer model printer or that does not have automatic peripheral detection capability, such as Windows® 3.1, it is necessary for the user to manually install the printer on the server.

A major drawback of this situation is that the printer must be installed each time the client connects to the server. For example, if a user installs a client printer on a server and subsequently disconnects the client from the server, the server configuration information relating to the printer is deleted. When the user reconnects to the server, the user must manually install the same printer again.

Adding to this inconvenience is the fact that if the user desires to operate the printer utilizing printer parameter settings that are different from the default settings, the user must also change the parameter settings each time the user connects to the server. For instance, if the default paper tray is the letter-size tray but the user always uses the legal-size paper tray, the user will have to set the paper tray parameter every time the user connects to a server and installs the printer.

The technology described below addresses these disadvantages, as it provides for client-side caching of server configuration information as well as peripheral device parameter settings. When the client is reconnected to a server after having been disconnected from a server session, the cached information is automatically transmitted to the server, where it is restored. The client user is thus relieved of the burden of having to manually install the printer or reset its parameter settings every time the client is connected to a server.

SUMMARY

A server-client environment provides for client-side caching of information related to a peripheral device so that the client may automatically restore the information to a server upon connection or reconnection with the server. Peripheral devices that may be connected to the client include printers, scanners, card readers, zip drives, etc. For discussion purposes, reference herein will be made to a printer. After the printer is initially configured on the server, subsequent installations are automatic. The client user is thus relieved from having to manually install the printer each time the user connects to a server.

It is noted that the term "install" has different meanings in the art. In a hardware context, "install" refers to physically connecting a peripheral device to a computer. In a software context, "install" refers to installing the software related to a connected peripheral device. If the peripheral device is a printer, a printer driver is installed and a printer queue is created. Unless otherwise noted, the term "install" as used herein means installing software that is related to a connected peripheral device. The peripheral device is physically connected to the client, but the software related to the peripheral device is installed on the server.

In a server/client environment, there may be no means for automatic detection and installation of peripheral devices, such as a printer, that are attached at the client. If so, then a client user must manually install a printer driver to render the printer operational. The user interaction required to install and configure the printer on the server are performed at the client, but the printer is installed on the server.

After the printer is manually installed on the server from the client, the portion of the server configuration that relates to the printer is sent to the client, where it is stored. In addition, printer parameter settings are sent to the server where they are returned to the client for storing with the server configuration information. When the server/client session in which the printer has been installed is terminated, the printer configuration on the server is deleted.

It is also noted that the technology as described herein may be implemented in a server/client system in which client peripheral devices are automatically detected and installed according to the method described in the above-referenced co-pending application. Utilizing the present technology in such a system provides the advantages described herein.

Subsequent installations are automatic, regardless of whether the client is connected to the same server or to a different server, or whether the initial installation was manual or automatic. When the connection is established, the client sends the cached server configuration and printer settings data to the server. The server utilizes this data to restore the printer configuration and printer settings to the state in which they were in prior to the termination of the session. The process is performed automatically, requiring little, if any, user interaction. Therefore, after the initial installation, the client user is provided with automatic printer installation on the client for that particular printer, and the previous printer settings are automatically restored. In addition, the installation and restoration are automatic even if the client (and printer) connects to a different server.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
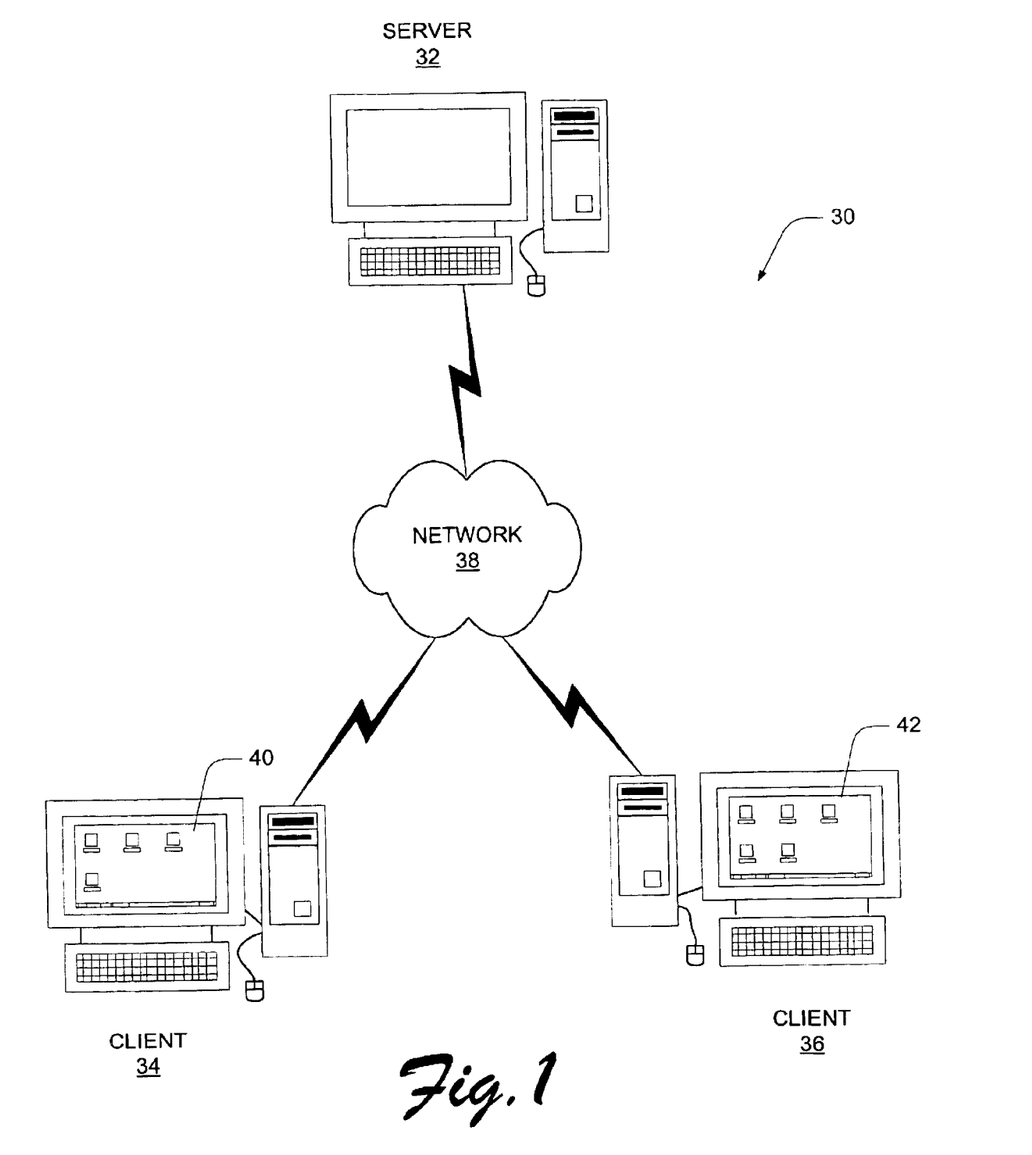
FIG. 1 is a diagrammatic illustration of a server/client system.

FIG. 1 shows a server/client computer system 30 having a server 32, a first client 34 and a second client 36 interconnected via a network 38. The server 32 and the clients 34, 36 have modems or network cards, which facilitate access (direct or otherwise) to the network 38 so that the server 32 and the clients 34, 36 can exchange information over the network 38. The clients 34, 36 each have a desktop 40, 42 interface displayed. In this embodiment, the server 32 and the clients 34, 36 are conventional computers.

It is noted that, although the server/client computer system 30 depicted in FIG. 1 has a first client 34 and a second client 36, there may be one to any number of clients connected to the server 32. The number of clients that may be connected to a server is limited only by the architecture of a particular server.

The server 32 is configured to provide a logically independent machine for each client 34, 36 connected to the network 38. That is, the server 32 establishes a session for each client 34, 36, provides the desktop 40, 42 for each client 34, 36, and makes server resources available to each client 34, 36. Such resources include, but are not limited to, allocations of processor time, memory, data storage, video processing, application programs, etc. A user of either of the clients 34, 36 interacts with the desktop 40, 42 on the client 34, 36 to run software applications that reside on the server 32. While the user provides input to and receives output from the client 34, 36, most processing is performed at the server 32.

The network 38 provides a communications link between the server 32 and the clients 34, 36 through which data is transmitted. The network 38 may be a local area network (LAN), a wide area network (WAN), the Internet, or the like, provided that it can accommodate server/client functionality.

Figure 2:
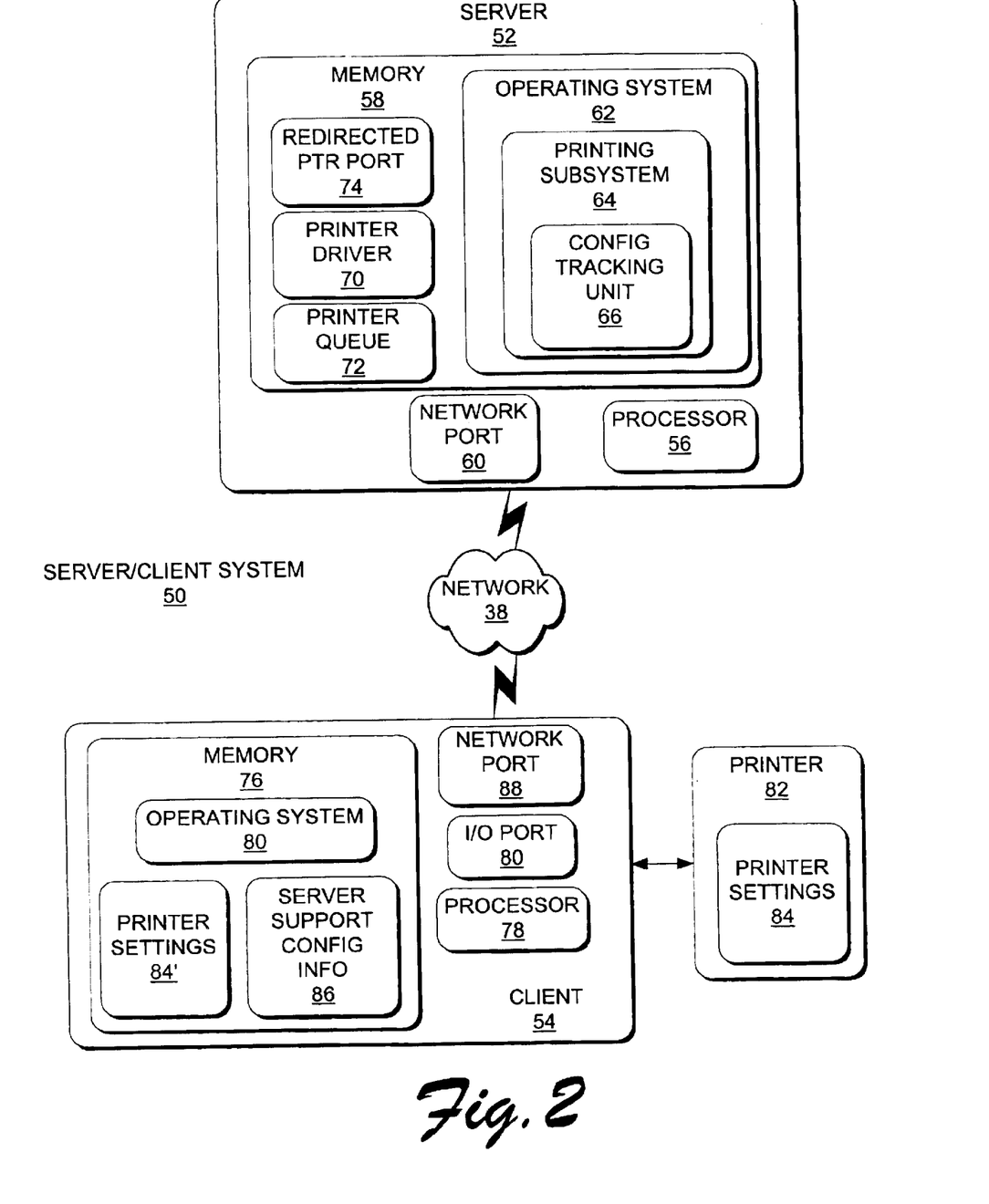
FIG. 2 is a block diagram of a server/client system.

FIG. 2 shows a server/client system 50 having a server 52 and a client 54. The server 52 includes a processor 56 and memory 58. The server 52 also has a network port 60, which facilitates access to the network 38. The network port 60 may be implemented as a modem, network card, or other device that interfaces the server 52 to the network 38.

The server 52 can be implemented as a common personal computer or other type of computer, such as a laptop computer, etc. The server 52 runs an operating system 62 which is stored in memory 58 and executes on the processor 56. The operating system 62 is a multitasking operating system such as a Windows® brand operating system from Microsoft Corporation (e.g., Windows® 98, Windows® 95, Windows® NT, or other derivative of Windows®). However, other operating systems may be used.

The server 52 has a printing subsystem 64 implemented in the operating system 62 stored in memory 58. The printing subsystem 62 is used to direct all operations involving printers and printing, including installing printers, creating and managing printer queues, removing printers, uninstalling printers, etc. The printing subsystem includes a configuration tracking unit 66 that is configured to monitor server configuration with regard to client peripheral devices that are installed on the server 52. This aspect of the printing subsystem 64 will be discussed in greater detail below.

The server 52 is shown having a printer driver 70 and a printer queue 72 installed and resident within the memory 58. It is noted, however, that the server 52 will only include the printer driver 70 and the printer queue 72 when a printer has been connected to the system 50 and installed on the server 52. The printer driver 70 is a printer-specific software program that provides an interface between a printer and the server 52 and allows the server 52 to provide print functions via a printer. When the printer driver 70 is installed on the server 52, the printer queue 72 is created. The printer queue 72 accepts print jobs from the server 52 and queues them for printing. It is noted that if the peripheral device is a device other than a printer, the printer driver will be a device driver for that peripheral device, if a device driver is required by the peripheral device.

The server 52 may also include a redirected printer port 74. The redirected printer port 74 is a virtual port created by the server 52 in the event that the server is unable to identify and install a compatible driver for a client-side printer. The redirected printer port 74 is exposed by the server and can be attached to a printer queue using standard printer queue creation techniques.

It is also noted that, although one printer driver 70 and one printer queue 72 are shown in the memory 58, there may be more than one printer driver or more than one printer queue 72 stored in the memory 58—corresponding to different client sessions. Also, the printer driver 70 and the printer queue 72 shown are accessible only for the session established for the client 54. The memory 58 may contain other printer drivers and printer queues that are installed for other sessions executing on the server 52. Printer drivers and printer queues installed for other sessions on the server 52 are not available for access by the client 54.

The client 54 includes memory 76, a processor 78, and an I/O port 80 having a printer 82 connected thereto. Although the client 54 is shown as having only one I/O port 80, it is noted that the client 54 may include more than one I/O port. The printer 82 has multiple printer settings 84, such as paper size, paper orientation, printing quality, etc. Printer settings 84' is a copy of the printer settings 84 that are stored in the memory 76 of the client 54 via a method that will be discussed in detail below. The memory 76 also stores server configuration information 86. The server configuration information 86 is data monitored by the configuration tracking unit 66 of server 52.

As previously noted, the configuration tracking unit 66 of server 52 is configured to monitor server configuration information relating to client peripheral devices that are installed on the server 52. In the illustrated example of a printer, such configuration information includes, but is not limited to, data associated with the printer driver 70, the printer queue 72, the redirected printer port 74, the printer settings 84, the I/O port 80 to which the printer 82 is connected, etc.

The server sends this configuration information 86 to the client 54, where it is stored in memory 76. The configuration information 86 related to the installation of the printer 82 is therefore readily available in the event that the configuration information 86 is required to be restored on the server 52. If the configuration information 86 subsequently needs to be restored on the server 52, the configuration information 86 is simply transmitted from the client 54 to the server 52.

The configuration tracking unit 66 is configured to detect new device installations, and can also detect when a peripheral device is removed from a system, and when a system user renames an I/O queue associated with a device. For example, if the printer 82 is removed from the system, or if the client user wishes to manually delete the printer queue 72 from the system 50, the client 54 sends notification to the server 52 to remove the printer 82. In response, the server removes all data structures related to the printer 82 (e.g., printer driver 70 and printer queue 72) from the server. The server will then send updated server configuration information 86 to the client 54, where it is stored in memory 76. When the updated information 86 is stored in the memory 76 of the client 54, it simply overwrites the old information.

Likewise, if a user renames the printer queue 72, the server will send updated server configuration information 86 to the client 54, where it is stored in memory 76.

Similar to the server 52, the client 54 also has a network port 88 to facilitate access to the network 38. The network port 88 may be implemented as a modem, network card, or other device which interfaces the client 54 to the network 38.

Figure 3:
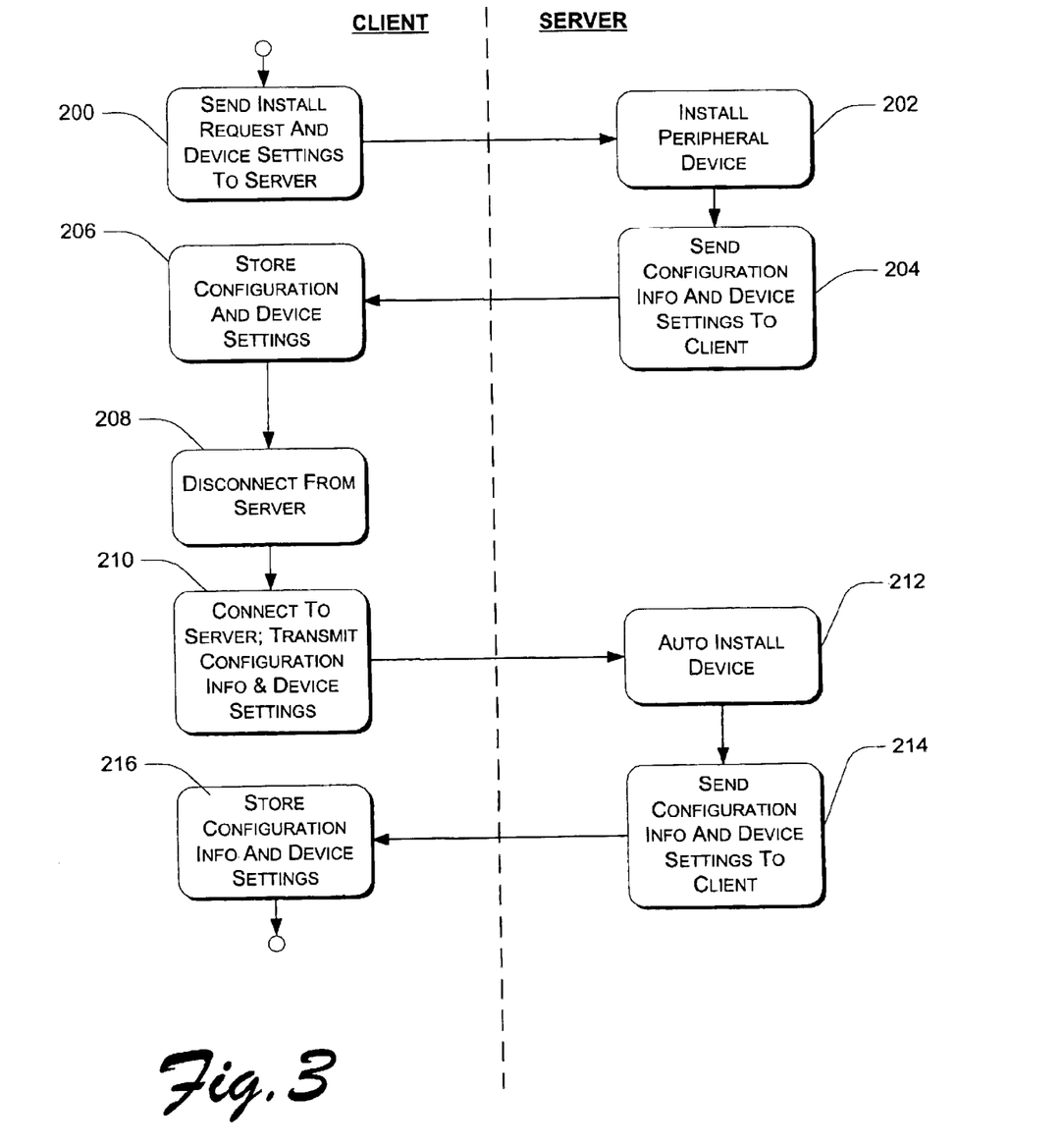
FIG. 3 is a flow diagram of a method for client-side caching of server configuration information and automatic installation of a peripheral device.

FIG. 3 is a flow diagram depicting a method for client-side caching of server configuration information and printer settings, and for automatically installing a peripheral device upon subsequent connection to a server. The method is described with continuing reference to FIGS. 1 and 2.

At step 200 in FIG. 3, the client 54 sends a request to the server 52 to install the printer 82 on the server 52. At this time, or immediately thereafter, the printer settings 84 are also sent to the server 52. When the server 52 receives the install request from the client 54, the server performs a manual installation of the printer 82 on the server 52 at step 202. Manual installation refers to a client user being required to identify the printer driver 70 associated with the printer 82 as well as the I/O port 80 to which the printer 82 is connected. The server prompts the user for this information through the I/O interface of client 54.

When the installation is complete, the configuration tracking unit 66 of the printing subsystem 64 sends server configuration information 86 to the client (step 204). At step 206, the client 54 stores the server configuration information 86 and the printer settings 84 in the memory 76.

When the client session has concluded, the client 54 is disconnected from the server 52 (step 208). Whenever the client 54 is disconnected from the server 52, all data structures associated with peripheral devices attached to the client 52 are deleted from the server 52.

At step 210, the client 54 is reconnected to the server 52. It is noted that, although the client 54 in this example is reconnected to the server 52, the client 54 may be connected to a different server (not shown) in another server/client system (not shown). The methodology is the same whether the client 54 is connected to the server 52 or to a different server (not shown). This is another advantage to the present invention in that, once the printer 82 is manually installed on the server 52, subsequent installations—whether they be on the server 52 or on another server (not shown)—are automatic.

Upon reconnection with the server 52, the client 54 transmits the server configuration information 86 that was stored during the previous connection, to the server 52. The printer settings 84 are also sent to the server 52. At step 212, the server 52 utilizes the server configuration information 86 received from the client 54 to automatically install the printer 82 on the server 52. This automatic installation is performed with minimal user interaction.

Once the printer 82 has been automatically installed on the server, the configuration tracking unit 66 of the server 52 sends the server configuration information 86 and the printer settings 84' to the client 54 (step 214). Upon receipt of this data, at step 216, the client 52 stores the server configuration information 86 and the printer settings 84 in memory 76.

Figure 4:
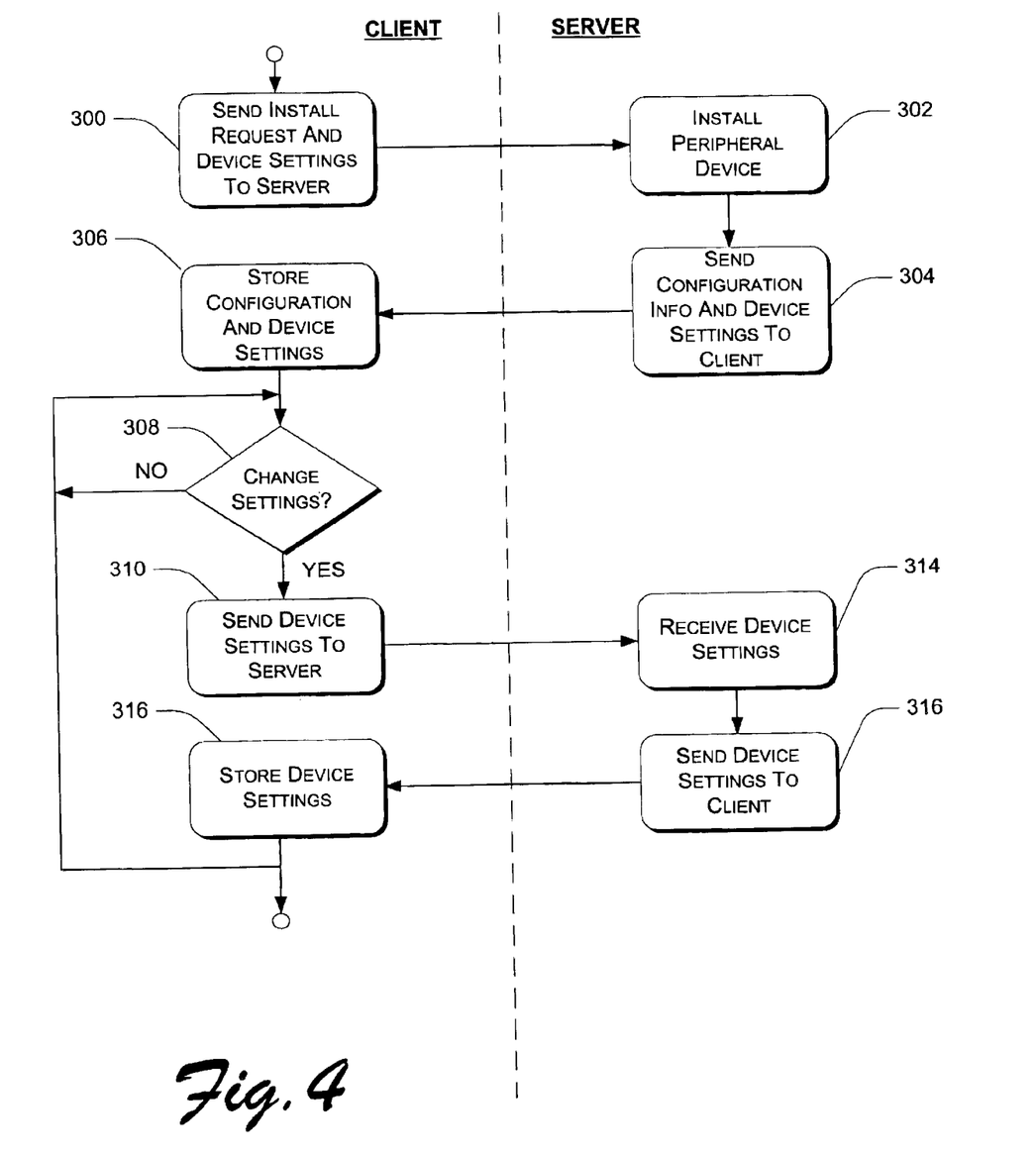
FIG. 4 is a flow diagram of a method for client-side caching of printer parameter settings and updating same.

FIG. 4 is a flow diagram depicting a method for client-side caching of server configuration information and printer settings, and for automatically updating peripheral device settings on the server. The method is described with continuing reference to FIG. 1 and FIG. 2. It is noted that the method of FIG. 4 is performed contemporaneously with the method described in FIG. 3. However, for discussion purposes, the methods are described separately.

At step 300 in FIG. 4, the client 54 sends a request to the server 52 to install the printer 82 on the server 52. At this time, or immediately thereafter, the printer settings 84 are also sent to the server 52. When the server 52 receives the install request from the client 54, the server performs a manual installation of the printer 82 on the server 52 at step 302. Manual installation refers to a client user being required to identify the printer driver 70 associated with the printer 82 as well as the I/O port 80 to which the printer 82 is connected.

When the installation is complete, the configuration tracking unit 66 of the printing subsystem 64 sends server configuration information 86 to the client (step 304). At step 306, the client 54 stores the server configuration information 86 and the printer settings 84' in the memory 76.

At step 308, the system 50 detects if the user makes any changes to the printer settings 84. If so, the changed printer settings 84 are sent to the server 52 at step 310. At step 314, the server 52 receives the updated printer settings 84. The updated printer settings 84 are sent to the client 54 at step 316. The client 54 then stores the updated printer settings 84 at step 316.

As described in the discussion for FIG. 3, the printer settings 84' are sent from the client 54 to the server 52 when the client 54 is reconnected to the server 52. By updating the cached printer settings 84' as they are updated by the user, the desired printer settings 84 are always restored when the client 54 is reconnected to the server 52.

CONCLUSION

The system and method as described herein provide a user with a way to automatically install peripheral devices on a server after they have been redirected on the server one time from a client. In addition, the user's device settings preferences are preserved from session to session, thereby saving the user from having to manually update these settings whenever a server-client connection is established. Once a manual installation has been performed, subsequent installations are automatic, whether the client is reconnected to the same server, or to a different server.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. In a system having a server and a client, a method comprising:

installing server support on the server for a peripheral device attached at the client;

transmitting server support configuration information related to the peripheral device from the server to the client; and storing the transmitted server support configuration information at the client, the server support configuration information is deleted from the server when the connection between the client and the server is terminated and upon establishing a new connection between the client and the server, the server support configuration information is utilized to automatically restore the server support for the peripheral device by transmitting the server support configuration information stored at the client to the server.

2. The method recited in claim 1, further comprising transmitting the server support configuration information from the client to the server upon reconnection of the client and the server.

3. The method recited in claim 1, the peripheral device having peripheral device settings, the method further comprising:

transmitting the peripheral device settings from the client to the server upon the establishment of a connection between the client and the server;

transmitting the peripheral device settings from the server to the client together with the configuration information; and storing the peripheral device settings at the client.

4. The method recited in claim 3, further comprising retransmitting the peripheral device settings from the client to the server whenever a peripheral device setting is changed.

5. The method recited in claim 1, wherein the peripheral device comprises a printer.

6. The method recited in claim 1, further comprising:

uninstalling server support for the peripheral device attached at the client;

transmitting new server support configuration information to the client, the new server support configuration information indicating that server support for the peripheral device has been uninstalled; and deleting the stored configuration information related to the uninstalled peripheral device from the client.

7. The method recited in claim 6, wherein the deleting is accomplished by overwriting the stored configuration information with the new server configuration information.

8. The method recited in claim 1, further comprising:

renaming a queue associated with the peripheral device that was created when the peripheral device was installed on the server;

transmitting subsequent configuration information from the server to the client, the configuration information denoting the renamed queue; and storing the subsequent configuration information denoting the renamed queue at the client.

9. The method recited in claim 1, wherein the configuration information includes one or more of the following: peripheral device name, port name, queue name, queue redirection information, redirected port information, and driver name.

10. One or more computer-readable media having a computer program which, when executed on a computer, performs the method of claim 1.

11. The method of claim 1, wherein the new connection is established between the client and a different server.

12. In a system, a server method comprising:

installing server support on a server for a peripheral device attached at a client;

transmitting server support configuration information related to the peripheral device to the client;

uninstalling the server support for the peripheral device in response to the client being disconnected from the server;

receiving the server support configuration information from the client upon reconnection with the client; and installing the server support for the peripheral device on the server in accordance with the received server support configuration information.

13. The method recited in claim 12, further comprising:

uninstalling the server support for the peripheral device; and transmitting updated server support configuration information to the client indicating that support for the peripheral device has been uninstalled.

14. The method recited in claim 12, further comprising:

receiving peripheral device settings from the client, the peripheral device settings pertaining to the peripheral device attached at the client; and transmitting the peripheral device settings to the client.

15. The method recited in claim 12, further comprising:

receiving peripheral device settings from the client, the peripheral device settings pertaining to the peripheral device attached at the client;

transmitting the peripheral device settings to the client together with the server configuration information.

16. In a server/client system, a client method comprising:

transmitting information to a server identifying a peripheral device attached at a client;

receiving server configuration information relating to installation of the peripheral device at the server; and storing the server configuration information, the server configuration information is uninstalled from the server upon termination of a server/client session.

17. The method recited in claim 16, further comprising:

transmitting information to the server regarding a peripheral device that has been detached from the client;

receiving updated server configuration information indicating the removal of data structures associated with the detached peripheral device; and storing the updated server configuration information.

18. The method recited in claim 16, wherein the peripheral device attached at the client has peripheral device settings, the method further comprising:
transmitting the peripheral device settings to the server;
receiving the peripheral device settings from the server; and
storing the peripheral device settings at the client.

19. The method recited in claim 18, further comprising retransmitting the peripheral device settings when a peripheral device setting is changed.

20. The method recited in claim 16, wherein the peripheral device is a printer.

21. The method recited in claim 16, further comprising:
transmitting information to the server to change a name of a queue associated with the peripheral device;
receiving updated server configuration information including the changed name of the queue; and
storing the updated server configuration information.

22. A server/client system, comprising:
a server;
a client;
at least one peripheral device connected at the client;
the server being configured to install the peripheral device and transmit configuration information related to the peripheral device to the client; and
the client being configured to store the transmitted configuration information and when the client and the server disconnect, the server deletes the configuration information, and when the client reconnects with the server, the stored configuration information is transmitted to the server.

23. The server/client system recited in claim 22, wherein:
the server is further configured to receive the configuration information transmitted from the client, and automatically reinstall the peripheral device utilizing the configuration information.

24. The server/client system recited in claim 22, wherein the client is further configured to disconnect from the server, reconnect to a server in a second server/client system, and automatically provide server configuration information to the second server enabling the second server to automatically install the peripheral device on the second server.

25. The server/client system recited in claim 22, wherein:
the peripheral device comprises peripheral device settings;
the client is further configured to transmit the peripheral device settings to the server, receive the peripheral device settings from the server, and store the peripheral device settings on the client.

26. The server/client system recited in claim 25, wherein the client is further configured to transmit the peripheral device settings in response to a change in the peripheral device settings.

27. The server/client computer system recited in claim 22, wherein the one or more peripheral devices comprises one or more printers.

28. The server/client computer system recited in claim 22 wherein:
the server is further configured to uninstall the peripheral device and transmit updated configuration information to the client, the updated configuration information indicating that the peripheral device has been uninstalled; and
the client is further configured to overwrite the stored configuration information with the updated configuration information.

29. The server/client computer system recited in claim 22 wherein the server is further configured to create a virtual port that is utilized by the client, and include information regarding the virtual port in the configuration information sent to the client.

30. A server system, comprising:
a printing subsystem configured to install a printer connected to a client and create a printer queue associated with the printer;
a configuration tracking unit configured to determine server configuration parameters related to the installed printer and transmit the server configuration parameters to the client;
the printing subsystem is further configured to uninstall the client printer, receive the server configuration parameters stored on the client, and automatically reinstall the printer.

31. The server system as recited in claim 30, wherein the printer includes printer settings and the tracking unit is further configured to receive the printer settings from the client and transmit the printer settings to the client.

32. A client for use in a server/client system, comprising:
a processor;
memory;
an operating system executable on the processor;
server configuration information stored in the memory;
at least one printer port;
a printer connected to the printer port;
wherein the operating system is configured to transmit information to a server indicating that the printer is connected to the client, to receive server configuration information from the server, store the server configuration information in the memory, and transmit the stored server configuration information to the server upon reconnection with the server, thereby enabling the server to reinstall the printer.

33. The client system as recited in claim 32, wherein the printer comprises printer parameter settings, and the operating system is further configured to transmit the printer parameter settings to the server, receive the printer parameter settings from the server, and store the printer parameter settings in the memory.

34. The client system as recited in claim 33, wherein the operating system is further configured to transmit, receive and store the printer parameter settings whenever the printer parameter settings are changed.

35. The client system as recited in claim 32, wherein the operating system is further configured to transmit information to a server indicating that the printer has been disconnected from the client, receive updated server configuration information from the server reflecting that the printer is no longer installed, and store the updated server configuration information in the memory.

36. The client system as recited in claim 32, wherein the operating system is further configured to transmit the stored server configuration information to a second server upon connection with the second server to enable the second server to automatically install the printer.

37. One or more computer-readable media having a computer program, when executed by a computer, performs the following steps:
identifying one or more peripheral devices connected at a client;
installing the one or more peripheral devices at a server connected to the client;

transmitting server configuration information related to the one or more peripheral devices from the server to the client;

storing the server configuration information on the client;

disconnecting the client from the server, wherein the server configuration information is deleted from the server;

reconnecting the client to the server;

transmitting the server configuration information from the client to the server; and automatically installing the one or more peripheral devices utilizing the transmitted server configuration information.

38. The computer-readable media as recited in claim 37, wherein the computer program further comprises the steps of:

transmitting peripheral device parameter settings from the client to the server;

receiving the peripheral device parameter settings from the server to the client; and storing the peripheral device parameter settings on the client.

39. The computer-readable media as recited in claim 37, wherein at least one of the one more peripheral devices is a printer.

40. The computer-readable media as recited in claim 37, wherein the computer program further comprises the stops of:

requesting that a queue associated with an installed peripheral device be renamed;

renaming the queue;

transmitting updated server configuration information from the server to the client, the updated server configuration information including the new queue name; and storing the updated server configuration information on the client.

* * * * *